United States Patent
Jeon

(10) Patent No.: US 7,231,286 B2
(45) Date of Patent: Jun. 12, 2007

(54) ENGINE TORQUE REDUCTION CONTROL METHOD

(75) Inventor: Byeong Wook Jeon, Seoul (KR)

(73) Assignee: Hyundai Motor Company, Seoul (KR)

(*) Notice: Subject to any disclaimer, the term of this patent is extended or adjusted under 35 U.S.C. 154(b) by 165 days.

(21) Appl. No.: 11/021,811

(22) Filed: Dec. 22, 2004

(65) Prior Publication Data

US 2005/0143888 A1    Jun. 30, 2005

(30) Foreign Application Priority Data

Dec. 30, 2003  (KR)  .................. 10-2003-0100773

(51) Int. Cl.
*F02D 41/08* (2006.01)
*G06F 19/00* (2006.01)

(52) U.S. Cl. .................. 701/54; 701/103; 123/339.1

(58) Field of Classification Search ............... None
See application file for complete search history.

(56) References Cited

U.S. PATENT DOCUMENTS

| | | | | |
|---|---|---|---|---|
| 5,295,415 A | * | 3/1994 | Abe et al. | 477/102 |
| 6,128,564 A | * | 10/2000 | Graf | 701/51 |
| 6,616,574 B2 | * | 9/2003 | Jeon | 477/109 |
| 6,766,238 B2 | * | 7/2004 | Graf et al. | 701/54 |

FOREIGN PATENT DOCUMENTS

| | | |
|---|---|---|
| JP | 2000-291470 | 10/2000 |
| KR | 1998-0017169 | 5/1998 |

* cited by examiner

*Primary Examiner*—Michael J. Zanelli
(74) *Attorney, Agent, or Firm*—Morgan Lewis & Bockius LLP

(57) ABSTRACT

According to an embodiment of the present invention, an engine torque reduction control is not performed when an ignition timing advance condition is satisfied at an idle state, and therefore, ignition timing retardation by an unnecessary torque reduction request from a TMS does not occur.

2 Claims, 2 Drawing Sheets

ENGINE TORQUE REDUCTION CONTROL METHOD

CROSS-REFERENCE TO RELATED APPLICATIONS

This application claims priority of Korean Application No. 10-2003-0100773, filed Dec. 30, 2003, the disclosure of which is incorporated herein by reference.

FIELD OF THE INVENTION

Generally, the present invention relates to an engine torque reduction control method. More particularly, the present invention relates to an engine torque reduction control method for improving an engine idle control performance.

BACKGROUND OF THE INVENTION

Generally, little torque reduction of an engine is performed in shifts such as a N-D shift, a N-R shift, a power-off downshift, and a lift-foot-up (LFU) shift in spite of a present power-off state because of a following tip-in (i.e., depression of an accelerator pedal) state. The small amount of torque reduction is for preparing the following tip-in state, and does not improve shift feel while an idle state is maintained during a shift.

A transmission management system (TMS) requests retardation of ignition timing in order to make a state that the small amount of torque reduction occurs during an engine idle state. In addition, an engine management system (EMS) advances the ignition timing for the following tip-in state.

Therefore, in a conventional art, there is a problem in that the ignition timing retardation request by the TMS and the ignition timing advance by the EMS contradict each other in the idle state.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide an engine torque reduction control method having non-limiting advantages of improving an engine idle control performance.

An exemplary engine torque reduction control method according to an embodiment of the present invention includes determining whether a throttle opening is greater than a predetermined throttle opening in the case that a torque reduction request signal has been received from a transmission management system (TMS), performing an engine torque reduction control corresponding to the torque reduction request signal if the throttle opening is greater than the predetermined throttle opening, and, if the throttle opening is not greater than the predetermined throttle opening, performing the engine torque reduction control corresponding to the torque reduction request signal only if an ignition timing advance condition is not satisfied.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

An embodiment of the present invention will hereinafter be described in detail with reference to the accompanying drawings.

Figure 2:
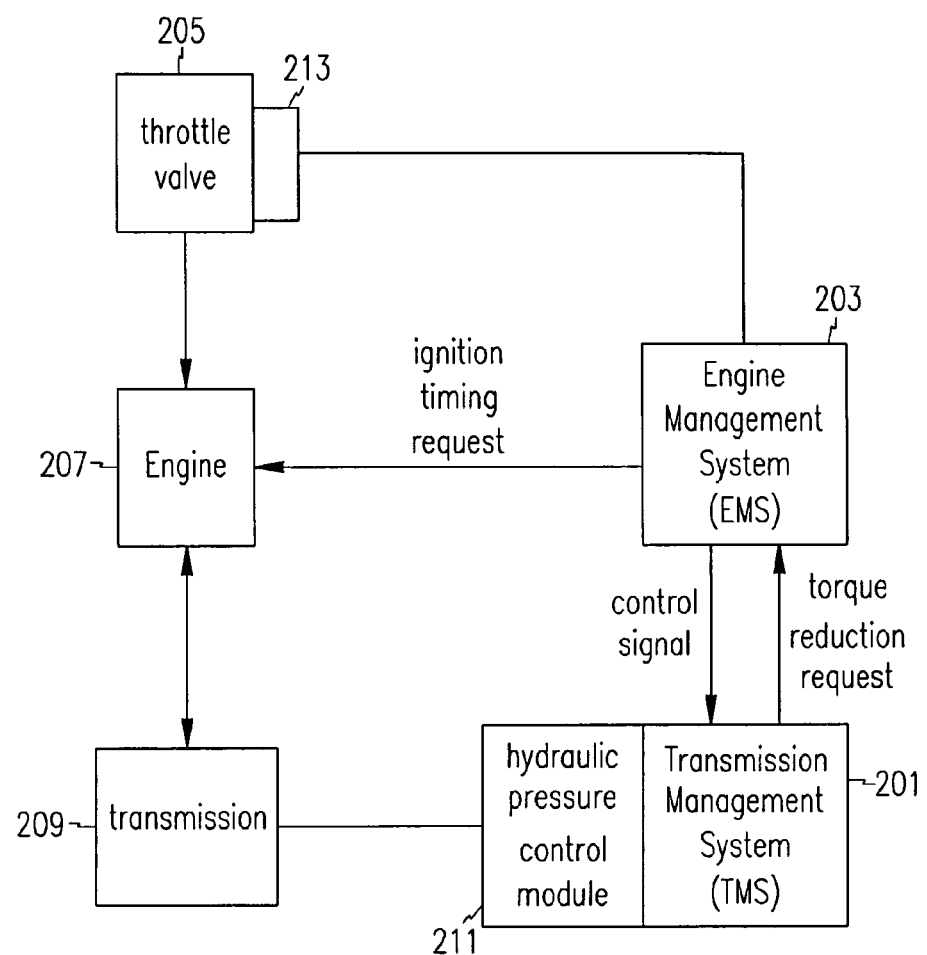
FIG. 2 is a diagram of a system for performing an engine torque reduction control method according to an embodiment of the present invention.

As shown in FIG. 2, the system for performing the engine torque reduction control method according to an embodiment of the present invention may include a transmission management system (TMS) 201, an engine management system (EMS) 203, a throttle valve 205, an engine 207, and a transmission 209.

The TMS 201 optimally controls the transmission 209 according to predetermined control schemes on the basis of information related to shifting. In addition, the TMS 201 controls a hydraulic pressure control module 211 which may be installed in the transmission 209, and controls supply and release of hydraulic pressure to and from various friction elements of the transmission 209.

The EMS 203 is a management system for an engine for controlling an amount of fuel, ignition timing, and so forth, and may include an electric control unit (ECU).

The throttle valve 205 regulates an amount of air-fuel mixture introduced into an engine by a control signal from the EMS 203. A throttle position sensor 213 detects a throttle opening.

The TMS 201 and the EMS 203 can be realized respectively by one or more processors activated by a predetermined program, and the predetermined program can be programmed to perform each step of a method according to an embodiment of this invention.

Figure 1:
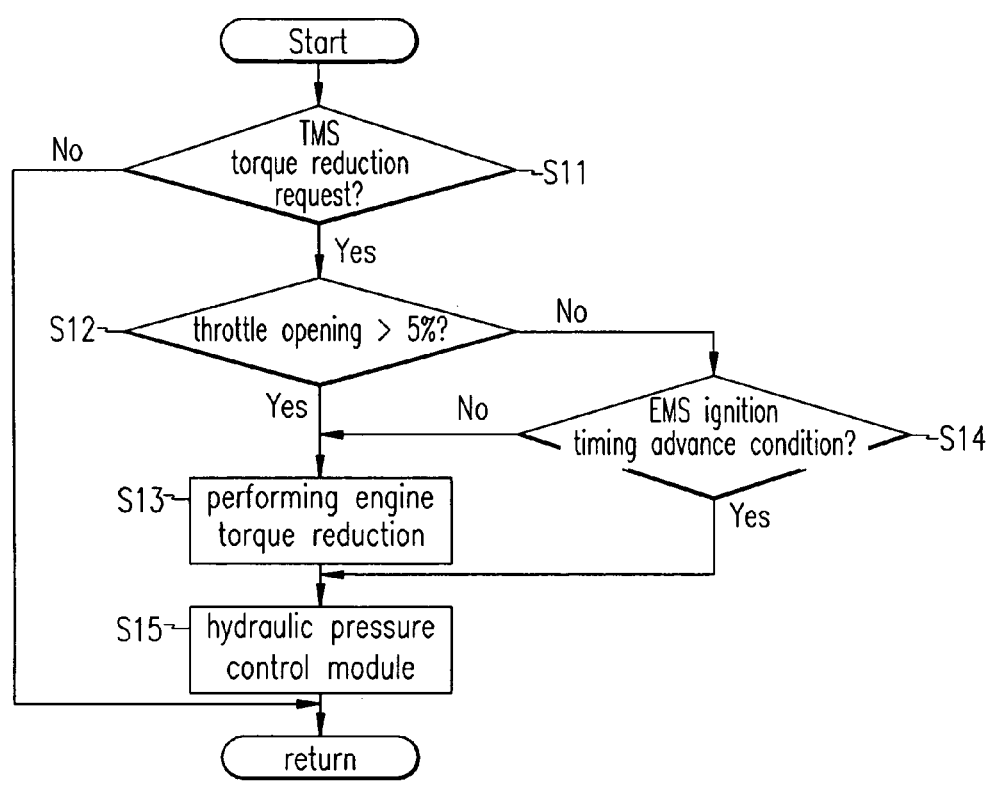
FIG. 1 is a flowchart showing an engine torque reduction control method according to an embodiment of the present invention.

Referring to FIG. 1, the engine torque reduction control method according to an embodiment of the present invention will be described in detail hereinafter.

First, at step S11, the EMS 203 determines whether a torque reduction request signal has been received from the TMS 201.

As is apparent to a person having ordinary skill in the art, the TMS 201 can determine whether an engine torque reduction control is necessary on the basis of at least one shift control parameter including a turbine speed (rpm), a turbine torque, and a transmission output shaft speed (rpm).

The EMS 203 determines, at step S12, whether a throttle opening is greater than a predetermined throttle opening, when it is determined at step S11 that the torque reduction request signal has been received from the TMS 201.

The predetermined throttle opening is preferably set as 5%, but it may be changed to other values by a person having ordinary skill in the art. The predetermined throttle opening (i.e., 5%) is a throttle opening during an idle state.

Subsequently, at step S13, the EMS 203 performs the engine torque reduction control such that an engine torque is reduced when the throttle opening is greater than the predetermined throttle opening i.e., 5% in step S12.

After performing the engine torque reduction control, the TMS 201 performs a hydraulic control by controlling the hydraulic pressure control module 211.

The EMS 203 determines, at step S14, whether an engine ignition timing advance condition exists, when the throttle opening is not greater than the predetermined throttle opening in step S12.

The EMS 203 may determine whether the engine ignition timing advance condition exists on the basis of intake air temperature, coolant temperature, or the like.

Because the engine ignition timing advance condition is obvious to a person having ordinary skill in this technical field, further explanation of the same will be omitted.

If it is determined at step S14 that the engine ignition timing advance condition exists, the TMS 201 performs, at step S15, a hydraulic control by controlling the hydraulic pressure control module 211, without performing the engine torque reduction control. Therefore, a collision between a torque reduction request and an ignition timing advance request can be avoided.

In this case, if the engine torque reduction control is performed as in the prior art, the torque reduction request of the TMS 201 contradicts the engine ignition timing advance condition.

Because the hydraulic control of step S15 is obvious to a person having ordinary skill in this technical field, a detail description of the same will be omitted.

On the other hand, if it is determined that the engine ignition timing advance condition does not exist at step S14, the EMS 203 performs the engine torque reduction control at step S13.

Because the EMS 203 does not determine that the ignition timing advance condition exists in this case, a contradiction between the torque reduction request and ignition timing advance request does not occur.

Advantages of the engine torque reduction control method according to the present invention are described hereinafter.

According to an embodiment of the present invention, an engine torque reduction control is not performed when an ignition timing advance condition is satisfied at an idle state, and therefore, ignition timing retardation by an unnecessary torque reduction request from a TMS does not occur.

In addition, according to an embodiment of the present invention, unnecessary service costs can be reduced because negative effects like engine malfunctions are prevented.

Furthermore, because idle performance is improved, NVH (Noise, Vibration and Harshness) characteristics are improved, so that driver comfort is improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An engine torque reduction control method comprising:
    determining whether a throttle opening is greater than a predetermined throttle opening if a torque reduction request signal has been received from a transmission management system;
    performing an engine torque reduction control corresponding to the torque reduction request signal, if the throttle opening is greater than the predetermined throttle opening; and
    if the throttle openinig is not greater than the predetermined throttle opening, performing the engine torque reduction control corresponding to the torque reduction request signal only if an ignition timing advance condition is not satisfied.

2. A system for engine torque reduction control, comprising:
    an engine management system communicating with an engine and a throttle valve; and
    a transmission management system controlling a hydraulic pressure control module and communicating with the engine management system and with a transmission cooperating with the engine,
    said engine management system being programmed for:
        determining whether a throttle opening is greater than a predetermined throttle opening if a torque reduction request signal has been received from the transmission management system;
        performing an engine torque reduction control corresponding to the torque reduction request signal, if the throttle opening is greater than the predetermined throttle opening; and
        if the throttle opening is not greater than the predetermined throttle opening, performing the engine torque reduction control corresponding to the torque reduction request signal only if an ignition timing advance condition is not satisfied.

* * * * *